United States Patent
Kashyap et al.

(10) Patent No.: US 10,158,523 B2
(45) Date of Patent: Dec. 18, 2018

(54) SYSTEM AND METHOD FOR NETWORK TOPOLOGY MANAGEMENT

(71) Applicant: DELL PRODUCTS L.P., Round Rock, TX (US)

(72) Inventors: Prakash Kashyap, Cupertino, CA (US); Arun Sarat Yerra, Santa Clara, CA (US)

(73) Assignee: Dell Products L.P., Round Rock, TX (US)

( * ) Notice: Subject to any disclaimer, the term of this patent is extended or adjusted under 35 U.S.C. 154(b) by 260 days.

(21) Appl. No.: 15/173,473

(22) Filed: Jun. 3, 2016

(65) Prior Publication Data

US 2016/0285677 A1    Sep. 29, 2016

Related U.S. Application Data

(63) Continuation of application No. 14/156,295, filed on Jan. 15, 2014, now Pat. No. 9,391,844.

(51) Int. Cl.
   *H04L 12/703* (2013.01)
   *H04L 12/24* (2006.01)
   *H04L 12/911* (2013.01)

(52) U.S. Cl.
   CPC ...... *H04L 41/0668* (2013.01); *H04L 41/0659* (2013.01); *H04L 41/0677* (2013.01); *H04L 41/12* (2013.01); *H04L 47/746* (2013.01)

(58) Field of Classification Search
   CPC .................................................. H04L 41/0677
   See application file for complete search history.

(56) References Cited

U.S. PATENT DOCUMENTS

| | | | |
|---|---|---|---|
| 8,040,914 B2 | 10/2011 | Green | 370/389 |
| 9,038,151 B1* | 5/2015 | Chua | H04L 45/02 |
| | | | 709/223 |
| 2001/0017845 A1 | 8/2001 | Bauer | 370/238 |
| 2009/0307336 A1* | 12/2009 | Hieb | H04J 3/0679 |
| | | | 709/220 |
| 2011/0149743 A1* | 6/2011 | Agarwal | H04L 41/0677 |
| | | | 370/242 |
| 2014/0362709 A1 | 12/2014 | Kashyap et al. | |

* cited by examiner

*Primary Examiner* — Hoon J Chung
(74) *Attorney, Agent, or Firm* — Haynes and Boone, LLP

(57) ABSTRACT

A system and method for network topology management includes a network controller having a control unit one or more ports coupled to the control unit and configured to couple the network controller to a plurality of switches in a network, and a memory coupled to the control unit and configured to store a topology of the switches. The topology includes a plurality of switch groups. The network controller is configured to assign a topology management module to each of the switch groups, receive a message from a switch indicating a topology change, determine when the topology change is a network link failure between switches within a first switch group that the network link failure is internal to the first switch group, and handle the network link failure when the network link failure is internal to the first switch group using the topology management module assigned to the first switch group.

20 Claims, 6 Drawing Sheets

SYSTEM AND METHOD FOR NETWORK TOPOLOGY MANAGEMENT

CROSS-REFERENCED APPLICATION

The present application is a continuation of U.S. patent application Ser. No. 14/156,295 filed on Jan. 15, 2014, which is incorporated by reference in its entirety.

BACKGROUND

The present disclosure relates generally to information handling systems, and more particularly to network topology management.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling all types of communication and information. Making all of this possible is a vast array of network switching products that make forwarding decisions in order to deliver packets of information from a source system or first network node to a destination system or second network node. Due to the size, complexity, and dynamic nature of these networks, sophisticated network switching products are often required to continuously make forwarding decisions and to update forwarding information as network configurations change. Further, as these networks are developed and reconfigured over time, a topology among each of the network switching products in the network may often become quite complex. Often a management strategy is applied to the network that may be used to establish desired and/or preferred network traffic forwarding and management patterns through the network. However, no one network management or forwarding strategy is typically ideal for the network as a whole as the strengths and weakness of the various management strategies depend significantly on the topology of the network.

Accordingly, it would be desirable to provide improved methods and systems for determining one or more possible network management or forwarding strategies for a network, provision the network switching devices of the network consistent with the management strategies, and monitor the network to determine when changes in the management strategies are appropriate.

SUMMARY

According to one embodiment, a network controller includes a control unit and one or more ports coupled to the control unit and configured to couple the network controller to one or more switches of a network. The network controller is configured to divide a physical topology of the network into a plurality of switch subgroups, determine one or more abstracted switch groups for each switch subgroup, select a base topology for each abstracted switch group, configure the each abstracted switch group with a corresponding first forwarding strategy consistent with each selected base topology, determine an abstracted topology for the network based on the physical topology and the each abstracted switch group, and configure the abstracted topology with a second forwarding strategy consistent with the abstracted topology.

According to another embodiment, a method of network management includes dividing a physical topology of a network coupled to a network controller into a plurality of switch subgroups, determining one or more abstracted switch groups for each switch subgroup, selecting a base topology for each abstracted switch group, configuring the each abstracted switch group with a corresponding first forwarding strategy consistent with each selected base topology, determining an abstracted topology for the network based on the physical topology and the each abstracted switch group, configuring the abstracted topology with a second forwarding strategy consistent with the abstracted topology, and monitoring the network to determine when a topology change occurs. The topology change is selected from a group consisting of a network link failure, an inter-chassis link (ICL) failure, a switch failure, detection of a new network link, and detection of a new switch.

According to yet another embodiment, an information handling system includes a network controller. The network controller includes a control unit and one or more ports coupled to the control unit and configured to couple the network controller to one or more switches of a network. The network controller is configured to divide a physical topology of the network into a plurality of switch subgroups, determine one or more abstracted switch groups for each switch subgroup, select a base topology for each abstracted switch group, assign a topology management module to the each abstracted switch group, configure the each abstracted switch group, determine an abstracted topology for the network based on the physical topology and the each abstracted switch group, configure the abstracted topology with a second forwarding strategy consistent with a spanning tree, and monitor the network to determine when a topology change occurs. The base topology for the each abstracted switch group is selected from a group consisting of a virtual link trunk (VLT), a square VLT (SVLT), a stacked switch, a spanning tree, and a destination lookup failure (DLF) tree. The topology change is selected from a group consisting of a network link failure, an inter-chassis link (ICL) failure, a switch failure, detection of a new network link, and detection of a new switch.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
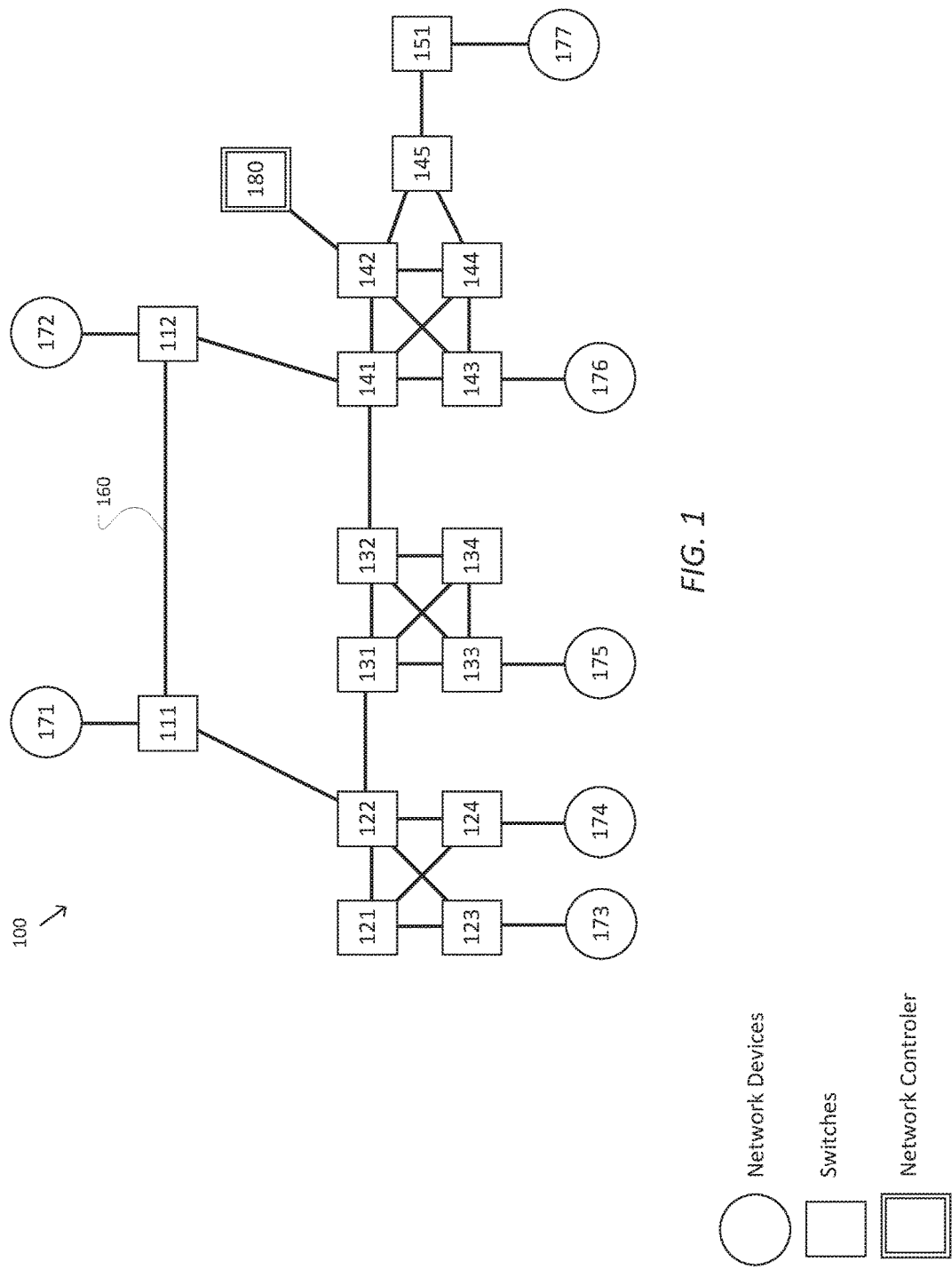
FIG. 1 is a simplified diagram of a physical network topology of an example network according to some embodiments.

FIG. 1 is a simplified diagram of a physical network topology of an example network 100 according to some embodiments. As shown in FIG. 1, network 100 includes several network switching devices, bridges, routers, switches, and/or the like 111, 112, 121-124, 131-134, 141-145, and 151. The switches 111, 112, 121-124, 131-134, 141-145, and 151 are interconnected using various inter-switch network links as shown by the solid lines between various combinations of the switches 111, 112, 121-124, 131-134, 141-145, and 151. For example, an inter-switch link 160 is shown coupling switches 111 and 112. And although each inter-switch link is shown as a single link, one of ordinary skill would understand that any of these inter-switch links may include multiple network links in parallel, such as would be found in a link aggregation group (LAG). Each of the switches 111, 112, 121-124, 131-134, 141-145, and 151 may perform switching and other forwarding tasks for network traffic being handled by network 100.

Network 100 further includes several network devices 171-177 that are coupled to at least one of the switches 111, 112, 121-124, 131-134, 141-145, and 151 via a respective network link. For example, network device 171 is coupled to switch 111 using a network link. In general, the network links between the switches 111, 112, 121-124, 131-134, 141-145, and 151 and the network devices 171-177 are not inter-switch links because they do not couple together two of the switches 111, 112, 121-124, 131-134, 141-145, and 151. In some examples, network devices 171-177 typically do not provide switching functions. In some examples, each of the network devices 171-177 may be a server, an end user device such as a work station, a laptop, a tablet, a mobile device, and/or the like. The switches 111, 112, 121-124, 131-134, 141-145, and 151 and the various network links in network 100 are typically used to forward network traffic between network devices 171-177 as well as to handle network management traffic in network 100.

Network 100 additionally includes a network controller 180. In some examples, network controller 180 may provide centralized management of network 100 and the network traffic throughout network 100. In some examples, network controller 180 may be using software defined networking (SDN) and/or OpenFlow. In SDN and/or OpenFlow, management and control of forwarding within network 100 may be at least partially separated from the switches that do the actual forwarding. In some examples, this may be used to provide more centralized management and control of the forwarding. As shown in FIG. 1, network controller 180 is shown coupled to switch 142 via a network link. One of ordinary skill, however, would recognize that network controller 180 may be coupled to network 100 through any of the switches 111, 112, 121-124, 131-134, 141-145, and 151. In some examples, network controller 180 may be coupled to network 100 through two or more of the switches 111, 112, 121-124, 131-134, 141-145, and 151.

The arrangement of the switches 111, 112, 121-124, 131-134, 141-145, and 151, the network devices 171-177, network controller 180 and the interconnections provided by the network links define the topology of network 100. Due to the complexity of the topology of network 100, it is not always a simple task for network controller 180 to select the best network management or forwarding strategy for moving network traffic from devices from one part of network 100 to devices in another part of network 100. For example, network controller 180 may select a network management or forwarding strategy that meets one or more of the following criteria: avoiding traffic paths where network packets travel in a loop; avoiding the delivery of duplicate network packets; guaranteeing that when a traffic path exists, it will be found; providing a shortest traffic path for unicast traffic, load balancing among multiple paths when multiple traffic paths are available; providing redundancy and/or rapid re-convergence during topology changes; rapidly recovering from failures in switches and/or inter-switch links; and/or the like.

One approach available to network controller 180 is to adopt a network management or forwarding strategy that may be applied to any network irrespective of the topology of the network. For example, a spanning tree may be applied to virtually any network topology. In some embodiments, network controller may implement a base topology based on a spanning tree by using a spanning tree protocol (STP), a multiple spanning tree protocol (MSTP), a destination lookup failure (DLF) tree protocol, and/or the like. For example, the DLF tree protocol uses a spanning tree for forwarding most network traffic, but also allows the use of inter-switch links that are not in the spanning tree to handle network packets for multicasting, flooding, and/or the like. By using each of the inter-switch links, the DLF tree protocol may also provide some resiliency during switch and inter-switch link failure. However, the DLF tree protocol is slow to re-converge on a new spanning tree when the topology changes due to the loss and/or addition of a switch and/or an inter-switch link.

Several network management or forwarding strategies are available that demonstrate fast re-convergence during topology changes as well as good resiliency during switch and/or inter-switch link failures. These network management or forwarding strategies include virtual link trunks (VLTs), square VLTs (VLTs), stacked switches, and/or the like. Despite the better re-convergence and resiliency properties, these network management or forwarding strategies are generally limited in the network topologies to which they may be applied. Further, they are typically not a suitable network management or forwarding strategy for a large network. In some examples, a preferred topology for a VLT occurs when two switches, coupled together by an inter-switch link, are also coupled in common to one or more other switches. In the examples of FIG. 1, switches 121 and 122 are good candidates for a VLT switch pair because they are coupled together by an inter-switch link and are both also coupled to switches 123 and 124. In some examples, a preferred topology for a SVLT occurs when four switches are all coupled to each other by inter-switch links, such as with the switches 131-134 with the square pattern of switches along with the diagonal inter-switch links between switches 131 and 134 and between switches 132 and 133.

A good compromise between the spanning tree network management or forwarding strategies that may be applied to any topology and the network management or forwarding strategies with faster re-convergence is to divide the network hierarchically. In this approach, the network may be divided into smaller switch groups with topology patterns that better match the network management or forwarding strategies with faster re-convergence. The network management or forwarding strategies with faster re-convergence are then used to manage the switch groups locally with a spanning tree network management or forwarding strategy, such as DLF, being used to manage the larger network with the switch groups being replaced with a virtual or abstracted switch. This leverages the better network management properties within the abstracted switch groups and also simplifies the spanning tree of the larger network as the abstracted network has fewer switches, allowing for an improvement in re-convergence. In some embodiments, the topology hierarchy may also improve the speed of re-convergence as changes to the topology may often be handled within one or two abstracted switch groups or in the smaller abstracted network topology.

Figure 2:
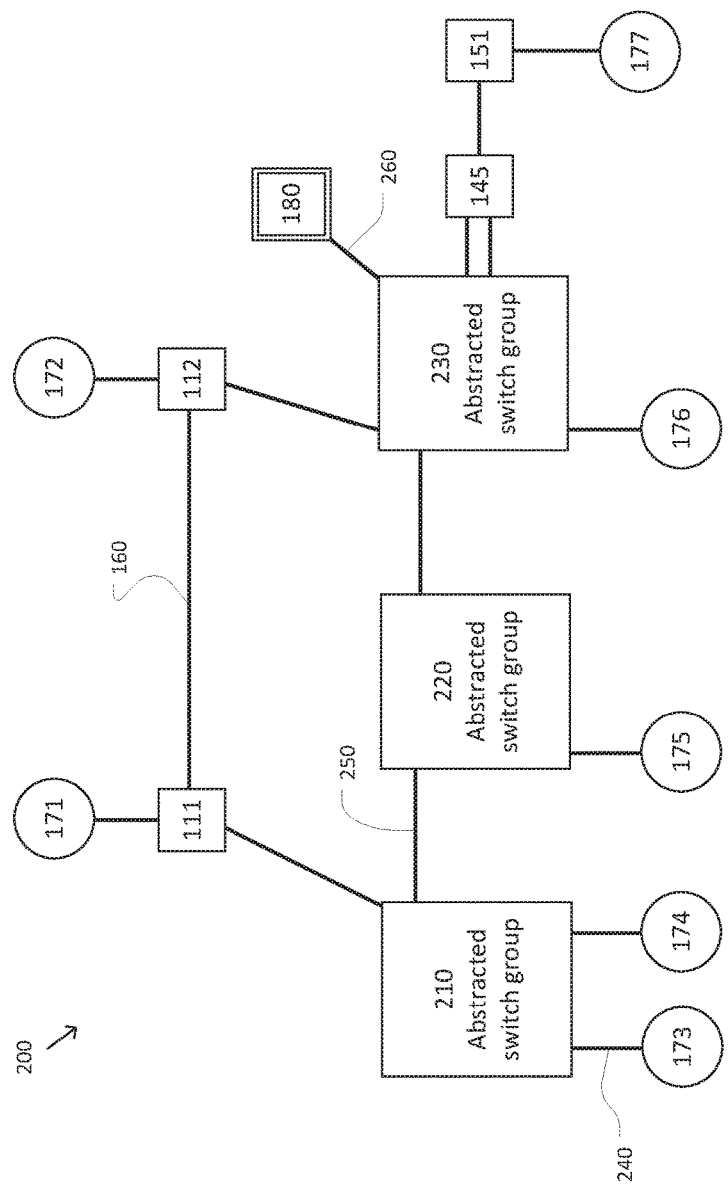
FIG. 2 is a simplified diagram of an example abstracted network topology of the network from FIG. 1 according to some embodiments.

FIG. 2 is a simplified diagram of an example abstracted network topology 200 of network 100 from FIG. 1 according to some embodiments. As shown in FIG. 2, several of the switches from network 100 have been abstracted into switch groups resulting in a topology with reduced complexity due to the corresponding reduction in the number of "switches" and inter-switch links in the abstracted topology of FIG. 2 in comparison to the physical topology in FIG. 1. In the abstracted network topology 200, each of the inter-switch links between the abstracted switch groups are maintained, but the interconnectivity is now modeled with the inter-switch link being coupled to the abstracted switch group rather than the individual switch.

As shown in FIG. 2, switches 121-124 may be replaced by an abstracted switch group 210. Switches 121-124 in the abstracted switch group 210 demonstrate a good topology pattern for a VLT pair with two leaf switches. Switches 121 and 122 may be the better choice for the VLT pair because they both have inter-switch links with both switches 123 and 124, whereas none of the other pairs of switches in the abstracted switch group 210 have inter-switch links with more than one other switch. Once switches 121 and 122 are chosen as a VLT pair, the inter-switch link between them becomes an inter-chassis link (ICL) and the switches 123 and 124 become leaf switches for the VLT. The switches 123 and 124 may also be included in the abstracted switch group 210 because leaf switches that couple to both the switches in the VLT pair may be managed by a topology management module for VLTs. No additional switches from network 100 may be included in the abstracted switch group 210 because they are not coupled to both of the VLT pair switches 121 and 122. Each of the network links coupling any of the switches 121-124, either to other switches or to network devices, are preserved in the abstracted network topology 200, but they may now be modeled as being coupled to the abstracted switch group 210 rather than the individual switches 121-124. For example, the network link between network device 173 and switch 123 becomes a network link 240 between network device 173 and abstracted switch group 210.

As additionally shown in FIG. 2, switches 131-134 may be replaced by an abstracted switch group 220. Switches 131-134 demonstrate a good topology pattern for a SVLT due to the pattern of four switches, all connected to each other via an inter-switch link. As with the abstracted switch group 210, each of the network links between the switches 131-134 and other network devices or switches outside the abstracted switch group 220 are preserved in the abstracted network topology 200. This also includes preserving the inter-switch link 250 between abstracted switch groups 210 and 220.

FIG. 2 also shows that switches 141-144 may be replaced by an abstracted switch group 230. Switches 141-144 demonstrate a good topology pattern for a SVLT, and even through switch 145 would be a leaf node should switches 142 and 144 be chosen as one of the two VLT pairs in the SVLT, switch 145 may not be managed by a topology management module for a SVLT because it does not share inter-switch links with the four switches in the SVLT.

No other switches in network 100 may be abstracted into switch groups based on VLTs or SVLTs because no other pair of switches in network 100 and abstracted network topology 200 have inter-switch links with a third switch. For example, little to no network management advantage may be gained by abstracting switches 111 and 112 into an abstracted switch group because they do not have inter-switch links with a common switch or abstracted switch group.

Network 100 may now be managed using a hierarchy of topology management modules. A top-level spanning tree based abstract topology manager, such as a DLF module, may be used to manage the abstracted network topology 200, because a spanning tree based abstract topology manager may be used with any topology. Each of the abstracted switch groups 210-230 may be managed internally using a topology management module appropriate to the topology of the switches and inter-switch links in the corresponding abstracted switch group 210-230. In some examples, abstracted switch group 210 may be managed using a topology management module for a VLT, and both of abstracted switch groups 220 and 230 may be managed using a topology management module for SVLTs.

Figure 3:
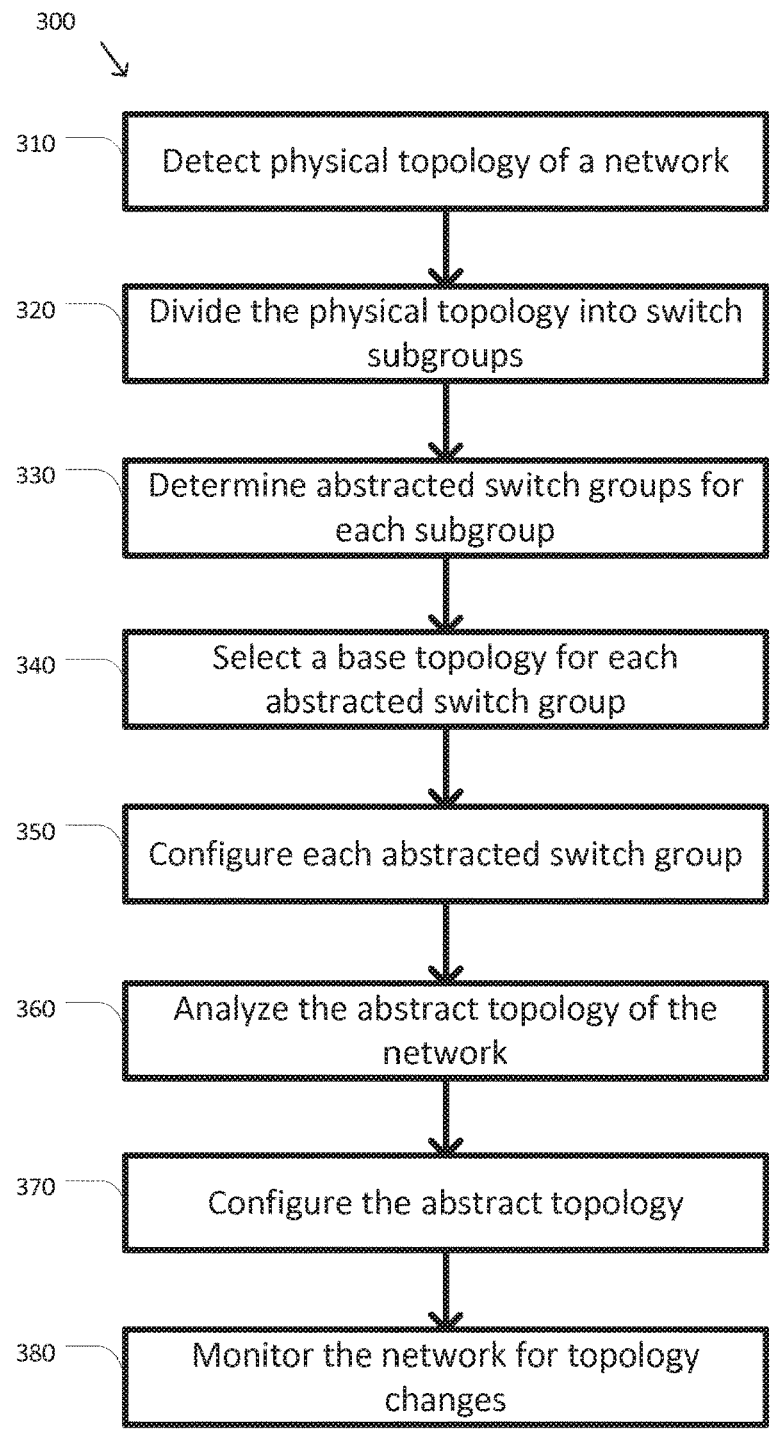
FIG. 3 is a simplified diagram of a method of managing a network according to some embodiments.

FIG. 3 is a simplified diagram of a method 300 of managing a network according to some embodiments. In some embodiments, one or more of the processes 310-380 of method 300 may be implemented, at least in part, in the form of executable code stored on non-transient, tangible, machine readable media that when run by one or more processors (e.g., the one or more processors of network controller 180) may cause the one or more processors to perform one or more of the processes 310-380. In some embodiments, method 300 may be performed in a network controller, such as network controller 180.

At a process 310, a physical topology of a network is detected. Using one or more discovery protocols, a network controller may discover the physical topology of the network. This may include detecting each of the switches in the network, the presence of non-switch network devices, as well as each of the inter-switch links between the switches and the network links between the switches and network devices. The network controller may also detect the presence of parallel inter-switch links that may be used to form LAGs. The network controller may detect the physical topology by exchanging one or more discovery messages with the switches in the network. U.S. patent application Ser. No. 13/911,548, entitled "System and Method for Base Topology Selection", which is hereby incorporated by reference for all purposes, describes how discovery messages may be used to detect the physical topology of a network.

At a process 320, the physical topology is divided into switch subgroups. Using the physical topology detected during process 310, the network controller divides the physical topology into smaller subgroups of switches that may be more easily analyzed to identify abstractable switch groups and the preferred types of topology management module that may be applied to them. The switch subgroups may be determined by using one or more heuristics or metrics that identify switches with preferred patterns of connectivity. One such metric is a network connectivity index. The network connectivity index counts the number of common switch neighbors between any pair of switches. Switch pairs with a higher network connectivity index are better candidates for VLT and/or SVLT pairs.

The network connectivity index for each switch pair may be determined by considering the physical network topology as a graph. Each edge in the graph between two switches, (i.e., those that correspond to inter-switch links) is assigned a network connectivity index. The network connectivity index for an edge may be determined by making two lists of switches. The first list of switches are those switches that are coupled to the switch at a first end of the edge by an inter-switch link, and the second list of switches are those switches that are coupled to the switch at a second end of the edge by an inter-switch link. The network connectivity index is then the number of switches in common between the first and second lists.

The network connectivity index may be applied to the examples of network 100 in FIG. 1. As an example, the network connectivity index for the inter-switch link between switches 111 and 112 is zero because switch 111 is coupled to switches 112 and 122 via inter-switch links (the first list), switch 112 is coupled to switches 111 and 141 via inter-switch links (the second list), and there is no switch on both lists. As another example, the network connectivity index for the inter-switch link between switches 121 and 122 is two because both switches 121 and 122 are coupled to both switches 123 and 124 by an inter-switch link. As yet another example, the network connectivity index for the inter-switch link between switches 122 and 124 is one because switches 122 and 124 are coupled to just switch 121 via an inter-switch link.

Once the network connectivity index is known for each of the inter-switch links, the physical network topology is divided into separate switch groups by separating the physical topology wherever the network connectivity index is zero. In the examples of network 100 in FIG. 1, the network 100 is divided into six switch subgroups: switch 111, switch 112, switches 121-124, switches 131-134, switches 141-145, and switch 151. Each of the switch subgroups with two or more switches becomes a candidate for one or more abstracted switch groups that may be used in an abstracted topology for the network.

At a process 330, abstracted switch groups are determined for each of the switch subgroups. Each of the switch groups determined during process 320 are further analyzed to determine whether one or more subsets of the switches in the switch groups has a topology suitable for abstraction. In some embodiments, groups that form SVLT topology patterns are extracted first and then groups that form VLT topology patterns are extracted second. In some examples, to detect the SVLT topology pattern, four switches that are all interconnected to each other via corresponding inter-switch links are identified. In the examples, of network 100 in FIG. 1, this corresponds to the switches 131-134 and the switches 141-144.

When the SVLT topology pattern is not found, the best candidates for VLT pairs may be identified by looking for the inter-switch links with the highest network connectivity index as a higher network connectivity index shows that the two switches associated with those inter-switch links provide more parallelism in the network. In some embodiments, additional criteria and/or heuristics may be used including types of each of the switches, numbers of external network links to switches and/or network devices not in the switch group, and/or the like. In some examples, switches of certain types, such as top of rack switches, may be better candidates for VLT pairs. In some examples, two switches of the same type (i.e., the same model) and/or switches of the same general type (e.g., both top-of-rack switches or both blade switches) may be better candidates for VLT pairs. In some examples, the characteristics of the switches may also be considered including the number of ports of different capacities and their relationship to the inter-switch links between the candidate VLT pair. In some examples, switches of candidate VLT switch pairs with more external network links may be better candidates for the VLT pairs.

In some embodiments, once SVLT groups and/or VLT pairs are selected, the leaf switches in the switch groups are also analyzed to determine whether they may be included in the abstracted switch group along with the SVLT group and/or the VLT pair. In some examples, when one of the switches in the switch group is coupled via an inter-switch link to each of the switches in the SVLT group and/or the VLT pair it may be added to the abstracted switch group because it may be managed with the same topology management module as the SVLT group and/or the VLT pair. In the examples of network 100 in FIG. 1, switches 123 and 124 may be added to the abstracted switch group including switches 121 and 122 because switches 123 and 124 are each coupled to both switches 121 and 122 via respective inter-switch links. In contrast, switch 145 may not be added to the abstracted switch group including switches 141-144 because switch 145 is not coupled to switches 141 and 143 via an inter-switch link. In some embodiments, decisions regarding whether to include leaf switches into the abstracted switch group may be determined by a topology management module assigned to the abstracted switch group.

Figure 4:
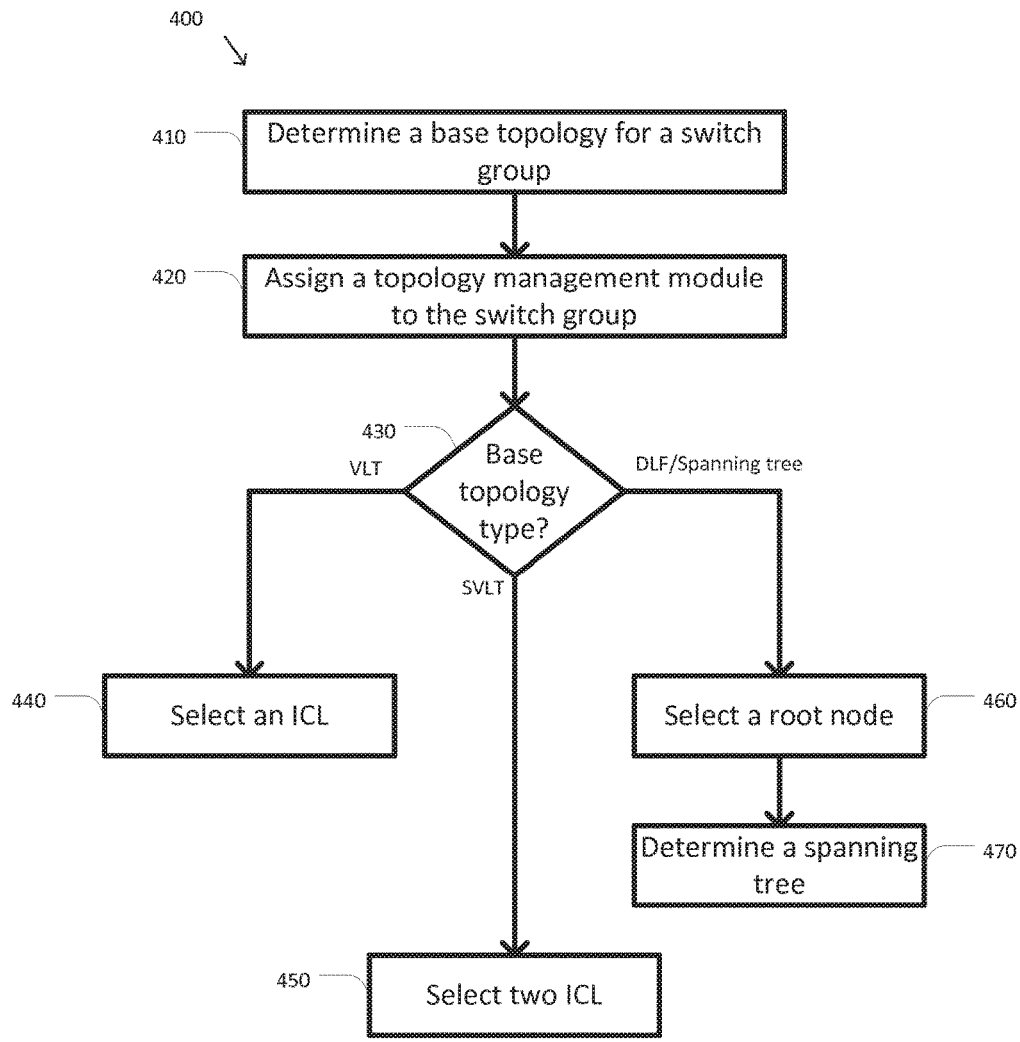
FIG. 4 is a simplified diagram of a process of selecting and setting up a base topology for a switch group according to some embodiments.

At a process 340, a base topology for each abstracted switch group is selected. Based on the heuristics applied during process 330, each of the abstracted switch groups is assigned a base topology and separate management of the abstracted switch group is set-up. FIG. 4, is a simplified diagram of a process 400 of selecting and setting up a base topology for a switch group according to some embodiments. In some embodiments, process 400 may be performed for each abstracted switch group determined during process 330.

At a process 410, a base topology of the switch group is determined. When the switch group includes a suitable SVLT topology as determined during process 330, the switch group is assigned a base SVLT topology. When the switch group is based around a VLT pair, the switch group is assigned a base VLT topology. When other topology-specific management strategies are used, such as switch stacking, a corresponding base topology is assigned to the switch group. When no other base topology is suitable, the switch group may be assigned a spanning tree based topology, such as a DLF tree, by default.

At a process 420, a topology management module is assigned to the switch group. To better facilitate separate management of the switch group, a topology management module suitable for the base topology determined for the switch group is assigned. In some examples, the topology management module may be assigned based on additional criteria, such as the types of switches in the switch group because configuration and/or other management factors may vary even though the base topology is the same.

At a process 430, additional set-up occurs based on the base topology type for the switch group. When the base topology for the switch group determined during process 410 is a VLT, the set up for the VLT begins with a process 440. When the base topology for the switch group determined during process 410 is a SVLT, the set up for the SVLT begins with a process 450. When the base topology for the switch group determined during process 410 is a DLF tree and/or a spanning tree, the set up for the DLF tree and/or the spanning tree begins with a process 460.

At the process 440, an ICL is selected for the VLT. Using the heuristics applied during process 330, a VLT pair is selected for the switch group and the inter-switch link between the VLT pair is selected as the ICL. When the inter-switch link includes multiple network links, the ICL may also be an ICL LAG. Once the ICL is selected, process 400 may end for VLT-based switch groups.

At the process 450, two ICLs are selected for the SVLT. A SVLT includes four possible candidates for selecting the two switch pairs and corresponding ICLs. In some embodiments, the general VLT pair selection heuristics may be used to select the first of the two ICLs. In some examples, the inter-switch link with the highest network connectivity index is selected as the first ICL. In some examples, the switch types and/or numbers of external network links may also be considered. Once the first ICL is selected, the second ICL is selected as the inter-switch link opposite the first ICL in the SVLT. Once the ICLs are selected, process 400 may end for SVLT-based switch groups.

At the process 460, a root node is selected. Using a spanning tree protocol, such as the DLF tree protocol, a root node for a spanning tree is selected. In some embodiments, the root node may be selected based on a number of network-links coupled to each of the switches in the switch group.

At a process 470, a spanning tree is determined. Using the root node determined during process 460, a spanning tree among the switches in the switch group is determined. In some examples, the spanning tree may be selected to minimize the length of the longest network path across the spanning tree. In some embodiments, when the DLF tree protocol is used, additional backup and/or redundant paths may also be determined. Once the spanning tree is determined, process 400 may end for spanning tree based switch groups.

Referring back to method 300 and FIG. 3, at a process 350, each of the abstracted switch groups is configured. The topology management module assigned during process 420 configures or provisions the switches in the corresponding abstracted switch group to implement a forwarding strategy consistent with the base topology selected during process 340. In some embodiments, this may include configuring the ports associated with the ICLs as ICL ports. In some embodiments, the inter-switch links with the leaf switches may be configured as VLT LAGs so that the leaf switches may forward traffic through the VLT pair and/or SVLT group using any of the inter-switch links in the VLT LAG. In some embodiments, the configuration may further include setting up the switches in the VLT pair and/or SVLT group to share forwarding information, disable network learning on the ICL, and/or the like. In some embodiments, the configuration may also include blocking and/or partially blocking traffic on some ports of the switches in the abstracted switch group. In some examples, the blocking and/or partial blocking may be used to keep general network traffic off of the ICL and/or to implement a spanning tree.

At a process 360, the abstract topology of the network is analyzed. Each of the abstracted switch groups determined during process 330 and set-up/configured during processes 340 and 350 are abstracted into an abstract or virtual switch node and are used to create the abstracted network topology. In the examples of FIGS. 1 and 2, process 360 is used to replace switches 121-124 with abstracted switch group 210, switches 131-134 with abstracted switch group 220, and switches 141-144 with abstracted switch group 230. In some embodiments, the abstracted network topology is then analyzed as a general topology to which a spanning tree protocol, such as the DLF tree protocol, may be used. In some examples, this includes identifying a root node and one or more spanning trees using an approach similar to methods 460 and 470. In some examples, the abstracted network topology may be assigned a suitable topology management module. In some embodiments, the analysis may include recursively repeating processes 320-350 to determine whether the abstracted network topology may be further abstracted by grouping switches and/or abstracted switch groups into another level of abstracted switch groups.

At a process 370, the abstract topology is configured. Using the general topology selected for the abstracted network topology during process 360, the switches in the abstracted network topology are configured or provisioned with a corresponding first forwarding strategy. In some embodiments, this may include blocking and/or partially blocking ports in the switches of the abstracted base topology as well as corresponding ports in the edge switches of the abstracted switch groups in order to implement the one or more spanning trees of the abstracted network topology.

At a process 380, the network is monitored for topology changes. The abstract topology manager for the abstracted network topology and/or the topology management modules assigned to each of the abstracted switch groups monitor the network to determine whether any changes in the topology of the network may have occurred. In some embodiments, this may include detecting failures in network links, failures in ICLs, failures in switches, addition of links and/or switches, and/or the like. In some embodiments, this monitoring may implement one or more resiliency policies and/or begin a process of re-convergence. In some embodiments, the topology change detected may be part of a planned outage, maintenance, and/or upgrade process.

Figure 5:
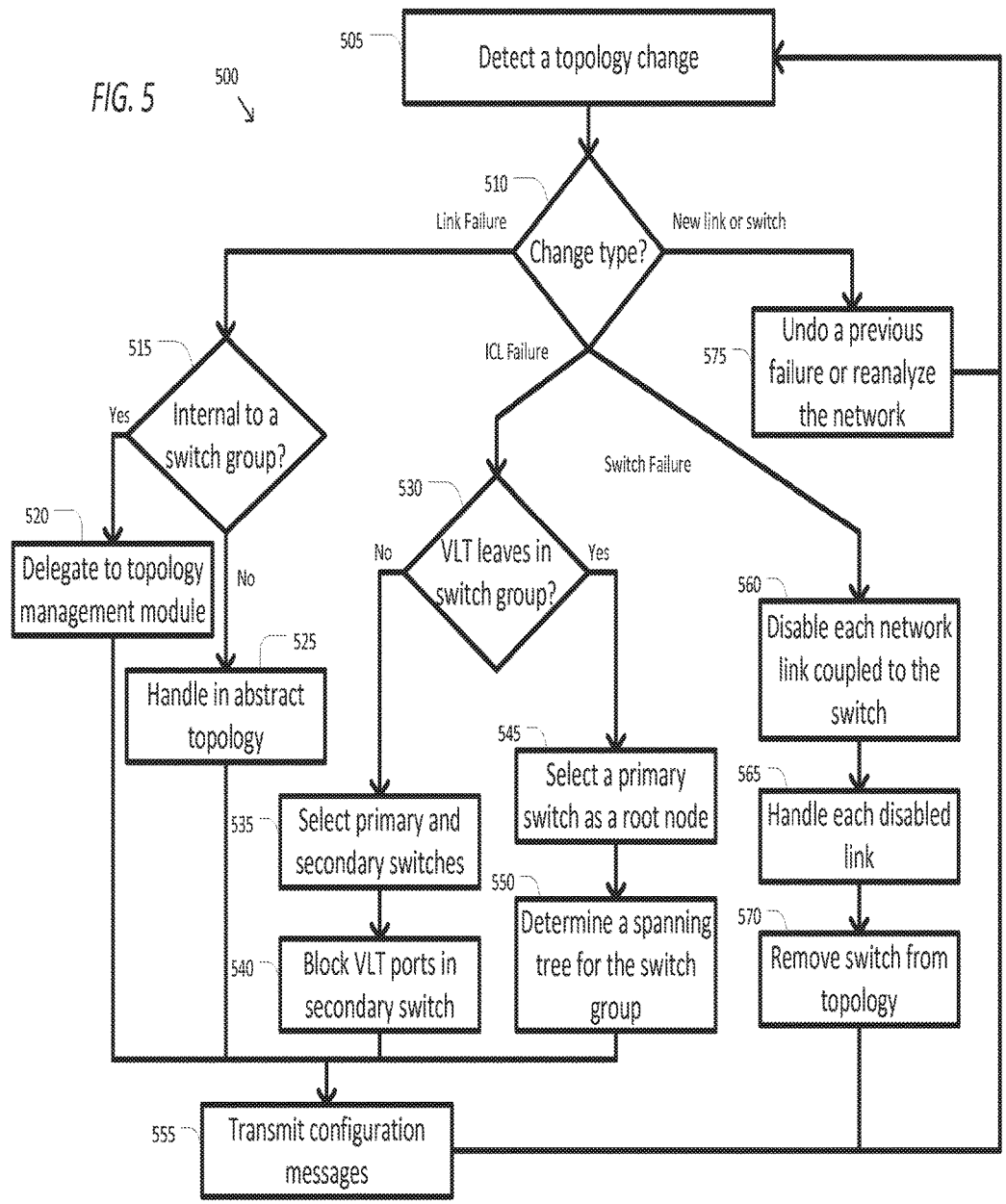
FIG. 5 is a simplified diagram of a method of monitoring a network according to some embodiments.

FIG. 5 is a simplified diagram of a method 500 of monitoring a network according to some embodiments. In some embodiments, one or more of the processes 505-575 of method 500 may be implemented, at least in part, in the form of executable code stored on non-transient, tangible, machine readable media that when run by one or more processors (e.g., the one or more processors of network controller 180) may cause the one or more processors to perform one or more of the processes 505-575. In some embodiments, method 500 may be performed in a network controller, such as network controller 180. In some embodiments, method 500 may be included in process 380.

At a process 505, a topology change is detected. As a network is being managed, a network controller periodically exchanges one or more status and/or management messages with the switches in the network. These status messages may be used to detect network topology changes.

In some embodiments, a failure in a network link and/or an ICL may be reported to the network controller by either or both of the switches associated with the network link. In some examples, the switches may notify the network controller when a network link down event is detected. In some examples, the switches may detect that a network link is down when one or more heartbeat messages on the network link are not received and/or responded to. In some examples, depending upon the location of the network link in the network, the changed state of the network link may be reported to the abstract topology manager and/or one or more of the topology management modules. In some examples, the failure of the network link may be reported to the topology management module for the abstracted switch group containing the network link and/or to the topology management modules for the abstracted switch groups coupled by the network link. In some embodiments, the failure in the network link and/or ICL may be ignored when additional network links in parallel to the failed network link exist. This is because the parallel network links may be used as an alternative path between the two switches, and the LAG or similar mechanisms in the switches may be able to handle the network link failure without an accompanying change in the topology of the network.

In some embodiments, a failure in a switch may be detected by not receiving heartbeat messages from the switch and/or by the failure of the switch to respond to an echo and/or similar request. As with the network link failures, the failure in a switch may be reported to the abstract topology manager and/or the topology management modules depending upon the location of the failed switch in the network and/or whether the switch is part of an abstracted switch group.

In some embodiments, new network links and/or switches may be detected as well. In some examples, a new network link (or one that is back up after a failure and/or other maintenance) may be reported to the network controller by the corresponding switches coupled via the network link. In some examples, a new switch (or one that is back up after a failure and/or other maintenance) may be detected by a login, registration, and/or other request received at the network controller from the switch.

At a process 510, the topology change is processed based on its type. When the topology change is due to a network link failure or other loss, the topology change is handled beginning with a process 515. When the topology change is due to an ICL failure or other loss, the topology change is handled beginning with a process 530. When the topology change is due to a switch failure or other loss, the topology change is handled beginning with a process 560. When the topology change is due to discovery of a new network link and/or switch, the topology change is handled beginning with a process 575.

At the process 515, it is determined whether the network link is internal to an abstracted switch group. When the network link is internal to an abstracted switch group, the topology management module for the abstracted switch group handles the failure beginning with a process 520. When the network link is not internal to an abstracted switch group and couples together either two switches not in an abstracted switch group or couples together a switch in an abstracted switch group to a switch outside of the abstracted switch group, the abstract topology manager handles the failure beginning with a process 525.

At the process 520, the network link failure is delegated to the topology management module. Topology management modules are typically able to handle internal network link failures using their own resiliency and/or re-convergence policies. In some examples, when the network link failure is between a VLT pair switch and a leaf switch, the topology management module may determine that the network link to the other of the VLT pair switches and the ICL may be used to forward network traffic through the abstract switch group. In some examples, when the network link failure is between corners of a square VLT, the other network links between the two VLT pairs may be used. In some examples, when the network link failure occurs in a spanning tree, alternate/redundant paths and/or a recomputed spanning tree may be determined and used. After the topology management module determines configuration changes, they are transmitted to the switches using a process 555.

At the process 525, the network link failure is handled in the abstract topology manager. When the network link failure occurs between switches and/or abstracted switch groups being managed through the abstract topology manager, the abstract topology manager adapts the abstracted network topology to the network link failure. In some examples, this may include the selection of alternate/redundant paths and/or a re-computation of a new spanning tree for the abstracted network topology. After the abstracted topology manager determines configuration changes, they are transmitted to the switches using process 555.

At the process 530, it is determined whether the VLT leaf switches are included in the abstracted switch group. When a failure occurs in an ICL network link, the handling of the failure may depend on whether the abstracted switch group containing the failed ICL also contains each of the leaf switches for the affected VLT pair. When each of the leaf switches is not included in the abstracted switch group, the failure affects more than the abstracted switch group and may be handled beginning with a process 535. When each of the leaf switches is included in the abstracted switch group, the failure may be handled by changing the base topology for the abstracted switch group beginning with a process 545.

At the process 535, primary and secondary switches are selected. When the ICL fails between VLT pair switches, whether part of a VLT or a SVLT, the VLT begins directing network traffic, where possible through one of the VLT pair switches. This VLT switch is selected as the primary switch and the other VLT pair switch is selected as a secondary switch. In some embodiments, the primary switch may be selected using one or more heuristics, including how many external network links each of the VLT pair switches has and/or the types of the VLT pair switches.

At a process 540, the VLT ports in the secondary switch are blocked. The ports of the secondary switch selected during process 535 that couple the secondary switch to the leaf switches are placed in a partially blocking state. In the partially blocking state, the inter-switch links to those ports may not be used for most network traffic, and this reconfiguration effectively sends the VLT traffic through the primary switch. The partially blocking state, however, should not block low level management traffic, such as traffic for the Link Aggregation Control Protocol (LACP) and Link Layer Discovery Protocol (LLDP), so that continued monitoring of the partially blocked network links may continue. In some embodiments, the partial port blocking may also include flushing any forwarding data structure entries that direct network traffic to the secondary switch. After the port blocking changes are determined, they are transmitted to the switches using process 555.

At the process 545, a primary switch is selected as a root node. When the leaf switches are part of the abstracted switch group, the re-convergence of the network may be handled by changing the base topology of the abstracted switch group containing the failed ICL. This may be accomplished by changing the base topology from a VLT and/or a SVLT to a spanning tree. As a first step, one of the VLT pair switches using the ICL is selected as a primary switch and becomes the root node for the spanning tree. In some embodiments, the primary switch may be selected using one or more heuristics, including how many external network links each of the VLT pair switches has and/or the types of the VLT pair switches.

At a process 550, the spanning tree is determined for the switch group. Using the root node selected during process 545, the spanning tree for the abstracted switch group is determined. In some examples, the spanning tree may be selected to minimize the length of the longest network path across the spanning tree. In some embodiments, when the DLF tree protocol is used, additional backup and/or redundant paths may also be determined. Once the spanning tree is determined, any configuration changes are transmitted to the switches using process 555.

At the process 555, configuration messages are transmitted to the switches. Once the configuration changes are determined by the topology management modules and/or the abstract topology manager, the network controller transmits one or more messages to each of the switches affected by the topology change. These configuration messages may be transmitted using any suitable protocol and/or using the provisioning and/or configuration mechanisms of the corresponding switches. Once the switches are reconfigured or reprovisioned, the network is re-converged, and monitoring for additional topology changes may continue by using process 505.

At the process 560, each network link coupled to the switch is disabled. Each of the inter-switch links used to couple the failed switch to the rest of the network is marked as disabled and/or failed.

At a process 565, each disabled link is handled. Each of the network links disabled during process 560 may be processed as a network link failure and/or a LAG failure using processes 515-555. In some embodiments, when the failed switch is also a VLT pair switch, processes 535 and/or 540 may be adjusted accordingly to reflect that no secondary switch may be selected.

At a process 570, the switch is removed from the topology. The failed switch is removed from the topology so that it is not inadvertently included in future network monitoring and/or management while the switch is failed. Once the switches are reconfigured, the network is re-converged, and monitoring for additional topology changes may continue by using process 505.

At the process 575, a previous failure is undone or the network is reanalyzed. A new network link and/or a new switch may be detected whenever an operator makes a physical change to the network, such as adding a new cable or bringing a new switch online. A new network link and/or a new switch may also be detected when a previously failed network link and/or switch comes back online, such as after scheduled maintenance. When the new network link and/or a new switch it detected, the network controller may update the base topologies, abstracted switch groups and/or the like based on the new routes through the network. In some embodiments, when the new network link and/or new switch represents the recovery of a previously failed network link and/or switch, the change may often be recovered by reversing a previous re-convergence due to the earlier failure. In some examples, this may be accomplished by reversing any corresponding previous configuration changes transmitted to the switches as a result of processes 515-570. In some embodiments, when the new network link and/or switch is truly new, this may have a significant impact on the physical topology of the network and method 300 may be repeated for the network.

As discussed above and further emphasized here, FIG. 5 is merely an example which should not unduly limit the scope of the claims. One of ordinary skill in the art would recognize many variations, alternatives, and modifications. In some embodiments, different failure handling and/or re-convergence approaches may be used. In some examples, when an ICL fails between one VLT pair in a SVLT, the base topology for that abstracted switch group may be converted to a VLT with both of the VLT switches associated with the ICL becoming additional leaf switches of the remaining VLT pair.

Figure 6:
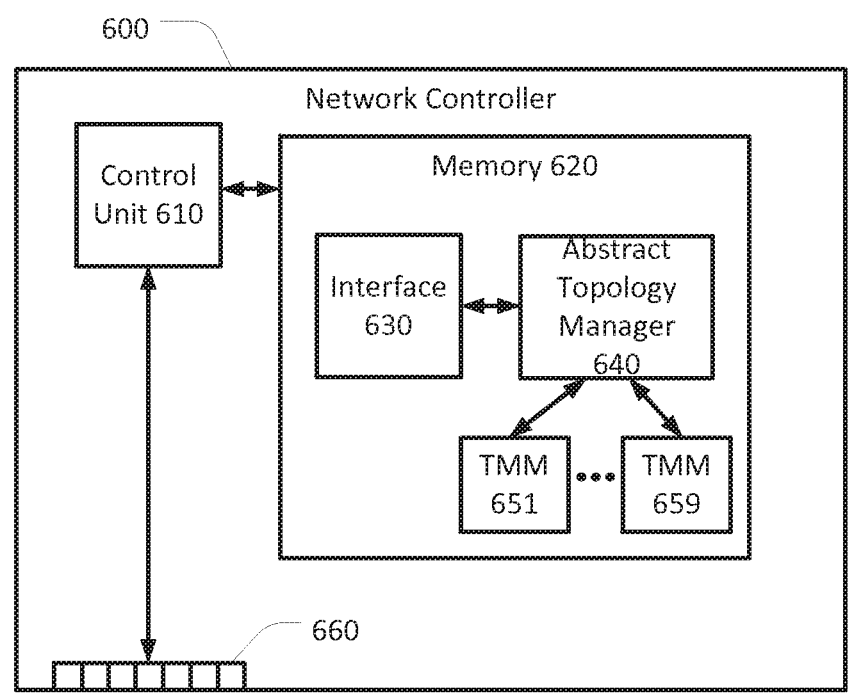
FIG. 6 is a simplified diagram of a network controller according to some embodiments.

FIG. 6 is a simplified diagram of a network controller 600 according to some embodiments. In some embodiments, network controller 600 may be network controller 180. As shown in FIG. 6, network controller 600 includes a control unit 610 coupled to memory 620. Control unit 610 may control the operation of network controller 600. In some examples, control units 610 may include one or more processors, central processing units, virtual machines, microprocessors, microcontroller, application specific integrated circuits (ASICs), field programmable gate arrays (FPGAs), and/or the like.

Memory 620 may be used to store one or more computer modules and their corresponding data structures. In some embodiments, the one or more computer modules may be implemented using software and/or a combination of hardware and software. Memory 620 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Memory 620 may include an interface 630 used by network controller 600 to communicate with and exchange network traffic with one or more switches and/or network devices coupled to network controller 600. For example, interface 630 may be used to exchange one or more network messages that are used to detect the physical topology of the network during process 310, configure the abstracted switch groups and/or abstract topology during processes 350 and/or 370, detect topology changes during process 505, transmit the configuration messages during process 555, and/or the like.

Memory 620 may further include one or more modules for managing portions of the topology in a network. An abstract topology manager 640 may be used to supervise the configuration of the network during method 300. Abstract topology manager 640 may further be used to oversee the monitoring of the network during method 500. As additional switch groups are identified and abstracted for separate management, one or more topology management modules (TMMs) 651-659 may be included in memory 620. Each of these topology management modules 651-659 may be used to configure and manage one or more abstracted switch groups. In some examples, the topology management modules 651-659 may be of different types depending upon the types of each of the abstracted switch groups in the network topology. In some examples, the types may include topology management modules for VLTs, SVLTs, stacked switches, spanning trees, DLF trees, and/or the like.

Network controller 600 further includes one or more ports 660 for coupling network controller 600 to the network using network links. In the examples of network 100, one or more of the ports 660 may be used to couple network controller 180/600 to switch 142 using the network link 260 as shown in FIG. 2.

Some embodiments of network controllers 180 and/or 600 and/or switches 111, 112, 121-124, 131-134, 141-145, and 151 may include non-transient, tangible, machine readable media that include executable code that when run by one or more processors (e.g., one or more processors in control unit 620) may cause the one or more processors to perform the processes of methods 300 and/or 500 and/or process 400 as described above. Some common forms of machine readable media that may include the processes of methods 300 and/or 500 and/or process 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A network controller comprising:
a control unit;
one or more ports coupled to the control unit and configured to couple the network controller to a plurality of switches in a network; and
a memory coupled to the control unit and configured to store a topology of the plurality of switches, the topology including a plurality of switch groups;
wherein the network controller is configured to:
assign a topology management module to each of the switch groups, each respective topology management module for a respective switch group manages each of the switches in the respective switch group;
receive a message from a first switch of the plurality of switches indicating a topology change;
determine a type of the topology change;
determine, when the type of the topology change is a network link failure, whether the network link failure is internal to a first switch group of the plurality of switch groups, the network link failure being internal to the first switch group when the network link failure is between switches within the first switch group; and
handle the network link failure when the network link failure is internal to the first switch group using the respective topology management module assigned to the first switch group.

2. The network controller of claim 1, wherein when the type of the topology change is a network link failure, a topology manager for the topology is configured to handle the network link failure when the network link failure is not internal to any of the plurality of one or more switch groups.

3. The network controller of claim 1, wherein the network controller is a software-defined networking (SDN) controller.

4. The network controller of claim 1, wherein the first switch group is selected from a group consisting of a virtual link trunk (VLT), a square VLT (SVLT), a stacked switch, a spanning tree, and a destination lookup failure (DLF) tree.

5. The network controller of claim 1, wherein the network controller is further configured to monitor the network to determine when a second topology change occurs, the second topology change being selected from a group consisting of an inter-chassis link (ICL) failure, a switch failure, detection of a new network link, and detection of a new switch.

6. The network controller of claim 5, wherein the network controller is further configured to:
when the topology change is the ICL failure, select a primary switch and a secondary switch from switches directly coupled by a corresponding failed ICL, and block ports of the secondary switch directly coupled to leaf switches of the primary and secondary switches when each of the leaf switches are not in a second switch group that includes the primary switch and secondary switch.

7. The network controller of claim 5, wherein the network controller is further configured to:
determine a spanning tree or a destination lookup failure tree for a second switch group when the topology change is the ICL failure, the ICL failure corresponding to an affected VLT pair, the affected VLT pair coupled to leaf switches that are included in the second switch group.

8. The network controller of claim 5, wherein when the topology change is the switch failure, the network controller is further configured to:
disable each network link directly coupled to a port of a corresponding failed switch; and
process each disabled network link as a corresponding link failure or a corresponding ICL failure.

9. A method of network management, the method comprising:
assigning, by a network controller, a topology management module to each of a plurality of switch groups of a network, each respective topology management module manages each switch of a plurality of switches in a respective switch group;
receiving, by flail the network controller, a message from a first switch indicating a topology change in the network;
determining a type of the topology change;
determining, when the type of the topology change is a network link failure, whether the network link failure is internal to a first switch group of the plurality of switch groups, the network link failure being internal to the first switch group when the network link failure is between switches within the first switch group; and
handling the network link failure when the network link failure is internal to the first switch group using the respective topology management module assigned to the first switch group.

10. The method of claim 9, wherein when the type of the topology change is a network link failure, further comprising handling, by a topology manager for the network, the network link failure when the network link failure is not internal to any of the plurality of switch groups.

11. The method of claim 9, wherein the network controller is a software-defined networking (SDN) controller.

12. The method of claim 9, wherein the first switch group is selected from a group consisting of a virtual link trunk (VLT), a square VLT (SVLT), a stacked switch, a spanning tree, and a destination lookup failure (DLF) tree.

13. The method of claim 9, further comprising monitoring, by the network controller, the network to determine when a second topology change occurs, the second topology change being selected from a group consisting of an inter-chassis link (ICL) failure, a switch failure, detection of a new network link, and detection of a new switch.

14. The method of claim 13, wherein when the topology change is the ICL failure, further comprising selecting a primary switch and a secondary switch from switches directly coupled by a corresponding failed ICL and blocking ports of the secondary switch directly coupled to leaf switches of the primary and secondary switches when the leaf switches are not in a second switch group that includes the primary switch and secondary switch.

15. The method of claim 13, further comprising determining a spanning tree or a destination lookup failure tree for a second switch group when the second topology change is the ICL failure, the ICL failure corresponding to an affected VLT pair, the affected VLT pair coupled to leaf switches that are included in the second switch group.

16. An information handling system comprising:
a plurality of switches in a network including a first switch; and
a network controller comprising:
a control unit; and
one or more ports coupled to the control unit and configured to couple the network controller to the plurality of switches; and
a memory coupled to the control unit and configured to store a topology of the plurality of switches, the topology including a plurality of switch groups and a topology manager;
wherein the network controller is configured to:
assign a topology management module to each of the switch groups, each respective topology management module for a respective switch group manages each of the switches in the respective switch group;
monitor the network to determine when one or more topology changes occur;
receive a message from the first switch of the plurality of switches indicating a first topology change;
determine a type of the first topology change;
determine, when the type of the first topology change is a network link failure, whether the network link failure is internal to a first switch group of the plurality of switch groups, the network link failure being internal to the first switch group when the network link failure is between switches within the first switch group; and
handle the network link failure when the network link failure is internal to the first switch group using the respective topology management module assigned to the first switch group.

17. The information handling system of claim 16, wherein when the type of the first topology change is a network link failure, the topology manager is configured to handle the network link failure when the network link failure is not internal to any of the plurality of switch groups.

18. The information handling system of claim 16, wherein the network controller is further configured to monitor the network to determine when a second topology change occurs, the second topology change being selected from a group consisting of an inter-chassis link (ICL) failure, a switch failure, detection of a new network link, and detection of a new switch.

19. The information handling system of claim 18, wherein the network controller is further configured to:
when the second topology change is the ICL failure, select a primary switch and a secondary switch from switches directly coupled by a corresponding failed ICL, and block ports of the secondary switch directly coupled to leaf switches of the primary and secondary switches when each of the leaf switches are not in a second switch group that includes the primary switch and secondary switch.

20. The information handling system of claim 18, wherein the network controller is further configured to:
determine a spanning tree or a destination lookup failure tree for a second switch group when the second topology change is the ICL failure, the ICL failure corresponding to an affected VLT pair, the affected VLT pair coupled to leaf switches that are included in the second switch group.

* * * * *